United States Patent
Baek (10) Patent No.: US 8,963,913 B2
(45) Date of Patent: Feb. 24, 2015

(54) STEREOSCOPIC IMAGE DISPLAY AND METHOD OF ADJUSTING STEREOSCOPIC IMAGE THEREOF

(75) Inventor: Heumeil Baek, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 165 days.

(21) Appl. No.: 13/312,493

(22) Filed: Dec. 6, 2011

(65) Prior Publication Data

US 2012/0274629 A1 Nov. 1, 2012

(30) Foreign Application Priority Data

Apr. 28, 2011 (KR) .................. 10-2011-0040005

(51) Int. Cl.
G06T 15/00 (2011.01)
H04N 13/00 (2006.01)
H04N 13/04 (2006.01)
H04N 13/02 (2006.01)

(52) U.S. Cl.
CPC ....... H04N 13/0022 (2013.01); H04N 13/0271 (2013.01)
USPC ............................... 345/419; 348/42; 348/51

(58) Field of Classification Search
CPC .......... G06T 19/00; G06T 17/20; G06T 17/00
USPC ......................................................... 345/419
See application file for complete search history.

(56) References Cited

U.S. PATENT DOCUMENTS

| | | | |
|---|---|---|---|
| 2002/0118275 A1* | 8/2002 | Harman | 348/51 |
| 2007/0081716 A1* | 4/2007 | Ha et al. | 382/154 |
| 2009/0315981 A1* | 12/2009 | Jung et al. | 348/43 |
| 2011/0081042 A1* | 4/2011 | Kim et al. | 382/100 |
| 2012/0127422 A1* | 5/2012 | Tian et al. | 351/158 |

* cited by examiner

*Primary Examiner* — David Zarka
*Assistant Examiner* — Tapas Mazumder
(74) *Attorney, Agent, or Firm* — Birch, Stewart, Kolasch & Birch, LLP (57) ABSTRACT

A stereoscopic image display includes a depth map extracting unit for extracting a region of interest (ROI) and a depth map from a 3D input image, an average depth for calculating unit calculating an average depth of the ROI, a depth map adjusting unit, which converts the average depth of the ROI into a screen depth value of a display panel, shifts depth values of the 3D input image in a shift direction of the average depth by a shifted amount of the average depth of the ROI, and adjusts a depth map of the 3D input image, a left/right eye image producing unit for producing left eye image data and right eye image data based on the adjusted depth map, and a display panel driver for displaying the left eye image data and the right eye image data on the display panel.

5 Claims, 11 Drawing Sheets

FIG. 1A

(RELATED ART)

FIG. 1B

(RELATED ART)

FIG. 1C

(RELATED ART)

FIG. 2

(RELATED ART)

FIG. 3

(RELATED ART)

STEREOSCOPIC IMAGE DISPLAY AND METHOD OF ADJUSTING STEREOSCOPIC IMAGE THEREOF

This application claims the benefit of Korean Patent Application No. 10-2011-0040005 filed on Apr. 28, 2011, the entire contents of which is incorporated herein by reference for all purposes as if fully set forth herein.

BACKGROUND OF THE INVENTION

1. Field of the Invention

Embodiments of the invention relate to a stereoscopic image display and a method of adjusting a stereoscopic image of the stereoscopic image display.

2. Discussion of the Related Art

A stereoscopic image display implements a 3D image using a stereoscopic technique or an auto-stereoscopic technique.

The stereoscopic technique, which uses a parallax image between left and right eyes with a high stereoscopic effect. The stereoscopic technique may be divided into a glasses type method and a non-glasses type method. In the glasses type method, the parallax image between the left and right eyes is displayed on a direct-view display or a projector through a change in a polarization direction of the parallax image or in a time-division manner, and thus a stereoscopic image is implemented using polarized glasses or liquid crystal shutter glasses. In the non-glasses type method, the stereoscopic image is implemented by separating an optical axis of the parallax image using an optical plate such as a parallax barrier and a lenticular lens.

The stereoscopic technique makes a viewer perceive that a virtual image is formed in front of or behind the screen on a display panel by a binocular disparity between a left eye image and a right eye image, thereby displaying the stereoscopic image. A stereoscopic feeling of the stereoscopic technique has a complementary relationship with a fatigue of the viewer depending on a degree of the binocular disparity of the stereoscopic image. 3D crosstalk, in which the viewer views a doubled image of the left and right eye images through his/her left or right eye, is generated depending on a method for implementing the stereoscopic image or an optimization degree in the stereoscopic image display using the stereoscopic technique.

When a position of the virtual image is equal to or greater than ±0.3 diopter (abbreviated 'D') away from the screen of the stereoscopic image display, the disagreement between convergence and accommodation of the user's eyes increases. As a result, as the virtual image becomes more distant from the screen of the display panel, the fatigue of the viewer increases. The diopter is the reciprocal of a focal length. As the position of the virtual image becomes more distant from the screen of the display panel, the occurrence of the 3D crosstalk may increase.

Figure 1A:
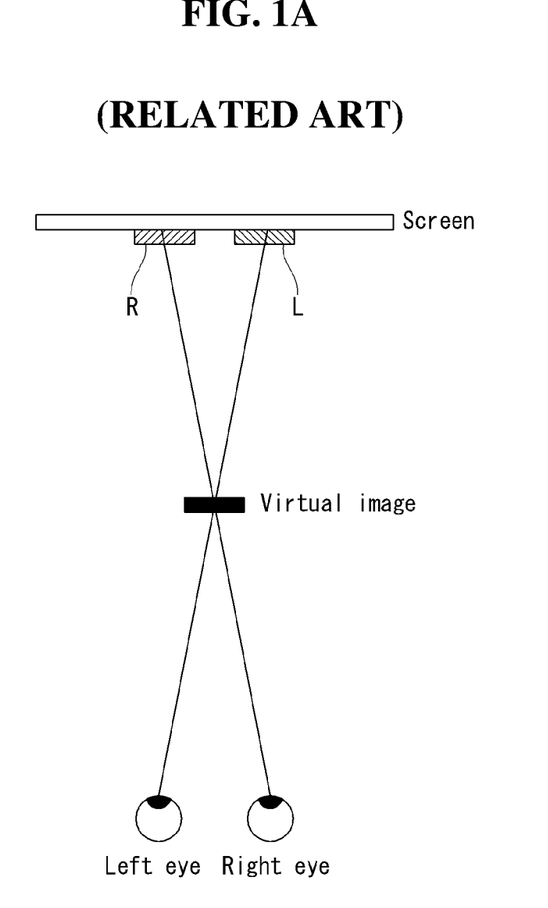
FIG. 1A illustrates an example where a virtual image is viewed in front of the screen in a stereoscopic image display.
Figure 1B:
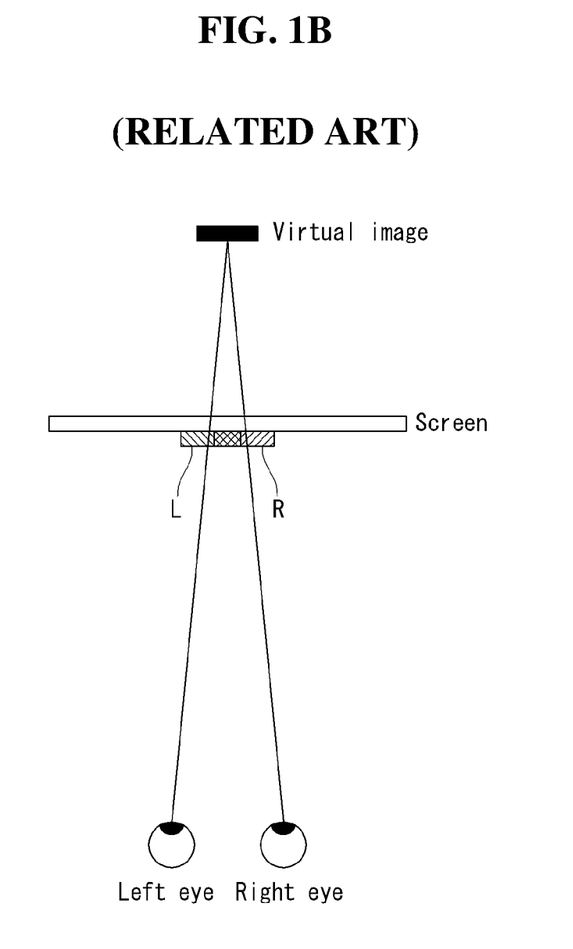
FIG. 1B illustrates an example where a virtual image is viewed behind the screen in a stereoscopic image display.

FIGS. 1A and 1B illustrate examples of a virtual image in the stereoscopic image display.

Figure 1C:
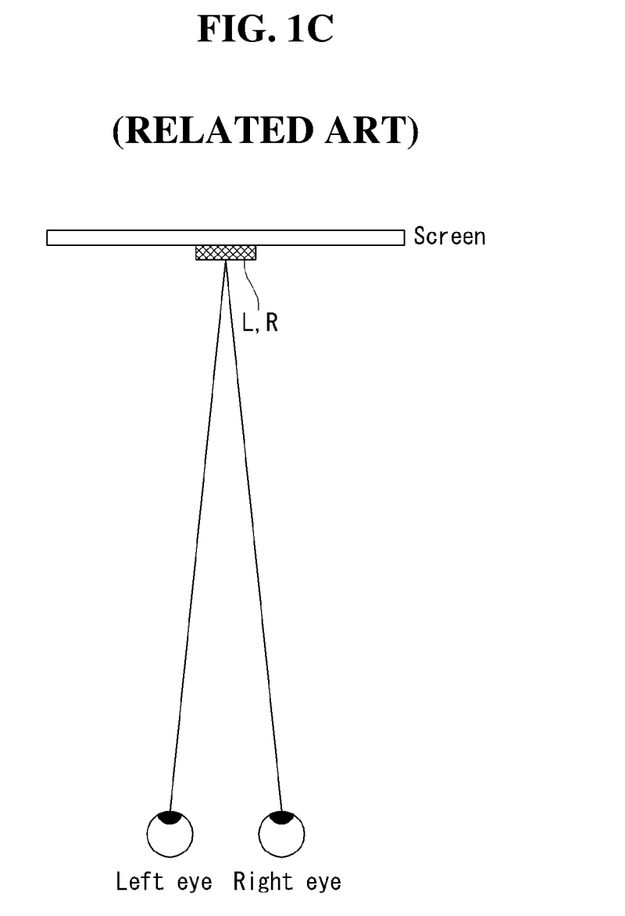
FIG. 1C illustrates an example where an image is viewed on the screen without a virtual image in a stereoscopic image display.

As shown in FIG. 1A, when light rays of a left eye image L viewed through the viewer's left eye and light rays of a right eye image R viewed through the viewer's right eye cross in the front of the screen, a focal point of a virtual image is formed in the front of the screen. Therefore, the virtual image is formed in the front of the screen. On the contrary, as shown in FIG. 1B, when light rays of the left eye image L viewed through the viewer's left eye and light rays of the right eye image R viewed through the viewer's right eye cross behind the screen, a focal point of a virtual image is formed behind the screen. Therefore, the virtual image is formed behind the screen. Further, as shown in FIG. 1C, when the left eye image L viewed through the viewer's left eye and the right eye image R viewed through the viewer's right eye are displayed on the screen without the binocular disparity, the viewer does not perceive the image displayed on the screen as the virtual image. In FIGS. 1A and 1B, there is the binocular disparity between the same pixel data of the left eye image L and the right eye image R. On the contrary, in FIG. 1C, there is no binocular disparity between the same pixel data of the left eye image L and the right eye image R.

In particular, when the viewer views a virtual image of a region of interest (ROI) of the stereoscopic image in the front of the screen, the fatigue of the viewer increases and the viewer may perceive greatly the 3D crosstalk. The ROI is known as an object of interest (OOI) or saliency and is an object which attracts the greatest interest of the viewer in the stereoscopic image. The viewer mainly views the ROI of the stereoscopic image. The ROI is a region of one screen of the stereoscopic image where is mainly in focus, a close-up people, an object which is greatly contrasted with the surroundings, etc.

Figure 2:
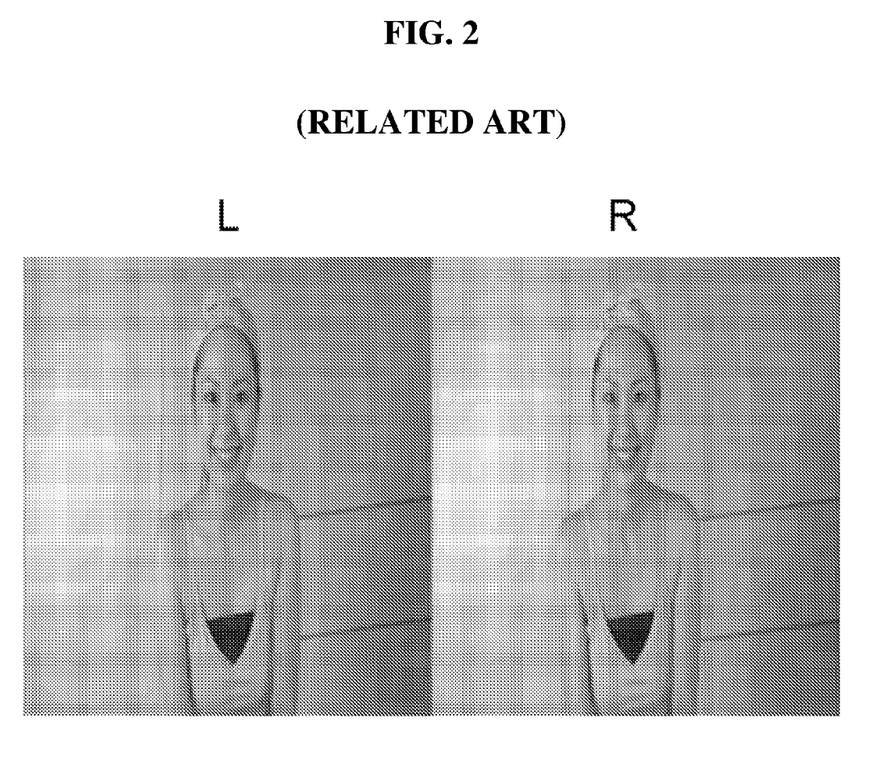
FIG. 2 illustrates a left eye image and a right eye image separated from a stereoscopic image.
Figure 3:
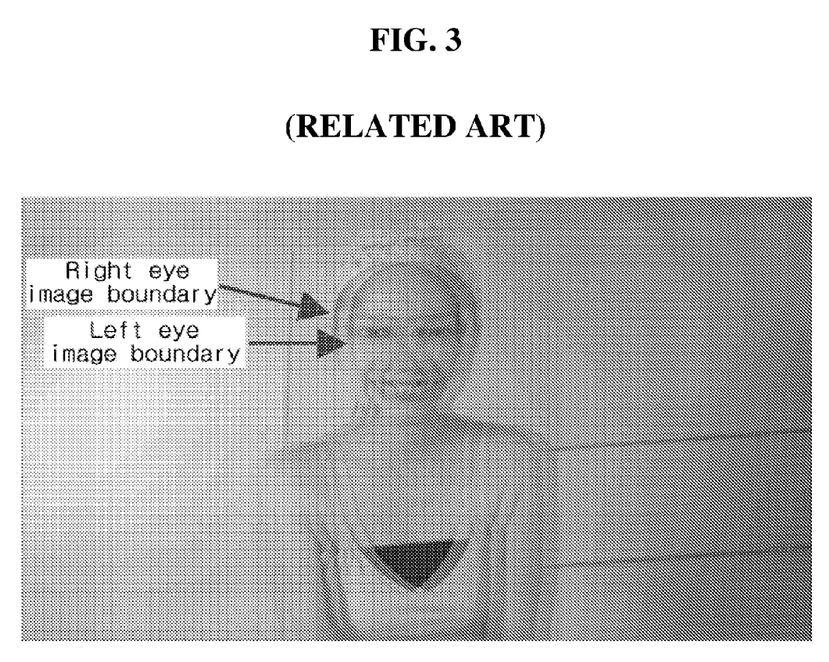
FIG. 3 illustrates a left eye image and a right eye image, whose resolutions are adjusted in conformity with a resolution of a display panel and which are displayed together on the display panel.

As shown in FIG. 2, data of a left eye image and a right eye image separated from the 3D image may be applied to the display panel. The ROI in FIG. 2 is a bust image of a close-up woman in the center of the screen. A resolution of each of the left eye image and the right eye image is adjusted in conformity with a resolution of the display panel, and the left eye image and the right eye image are together displayed on the display panel. As a result, as shown in FIG. 3, the viewer views a virtual image of the ROI in front of the screen because of the binocular disparity of the ROI and views a doubled image of the left eye image and the right eye image, thereby perceiving the 3D crosstalk.

SUMMARY OF THE INVENTION

Embodiments of the invention provide a stereoscopic image display and a method of adjusting a stereoscopic image of the stereoscopic image display capable of reducing a fatigue of a viewer without a loss of a stereoscopic feeling.

In one aspect, there is a stereoscopic image display including an ROI and depth map extracting unit configured to extract a region of interest (ROI) and a depth map from a 3D input image, an average depth calculating unit configured to calculate an average depth of the ROI, a depth map adjusting unit configured to convert the average depth of the ROI into a screen depth value of a display panel, shift depth values of the 3D input image in a shift direction of the average depth by a shifted amount of the average depth of the ROI, and adjust a depth map of the 3D input image, a left/right eye image producing unit configured to produce left eye image data and right eye image data based on the depth map adjusted by the depth map adjusting unit, and a display panel driver configured to display the left eye image data and the right eye image data received from the left/right eye image producing unit on the display panel.

The stereoscopic image display further includes a 2D-3D image converter configured to convert a 2D input image into the 3D input image.

The display panel is implemented as a display panel of one of a liquid crystal display (LCD), a field emission display (FED), a plasma display panel (PDP) display, an electroluminescence device (EL), and an electrophoresis display (EPD). An electroluminescence device (EL) may be include an organic light emitting diode (OLED), In another aspect, there is a method of adjusting a stereoscopic image of a stereoscopic image display, the method including extracting a region of interest (ROI) and a depth map from a 3D input image, calculating an average depth of the ROI, converting the average depth of the ROI into a screen depth value of a display panel and shifting depth values of the 3D input image in a shift direction of the average depth by a shifted amount of the average depth of the ROI to adjust a depth map of the 3D input image, producing left eye image data and right eye image data based on the adjusted depth map, and displaying the left eye image data and the right eye image data on the display panel.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention.

Figure 4:
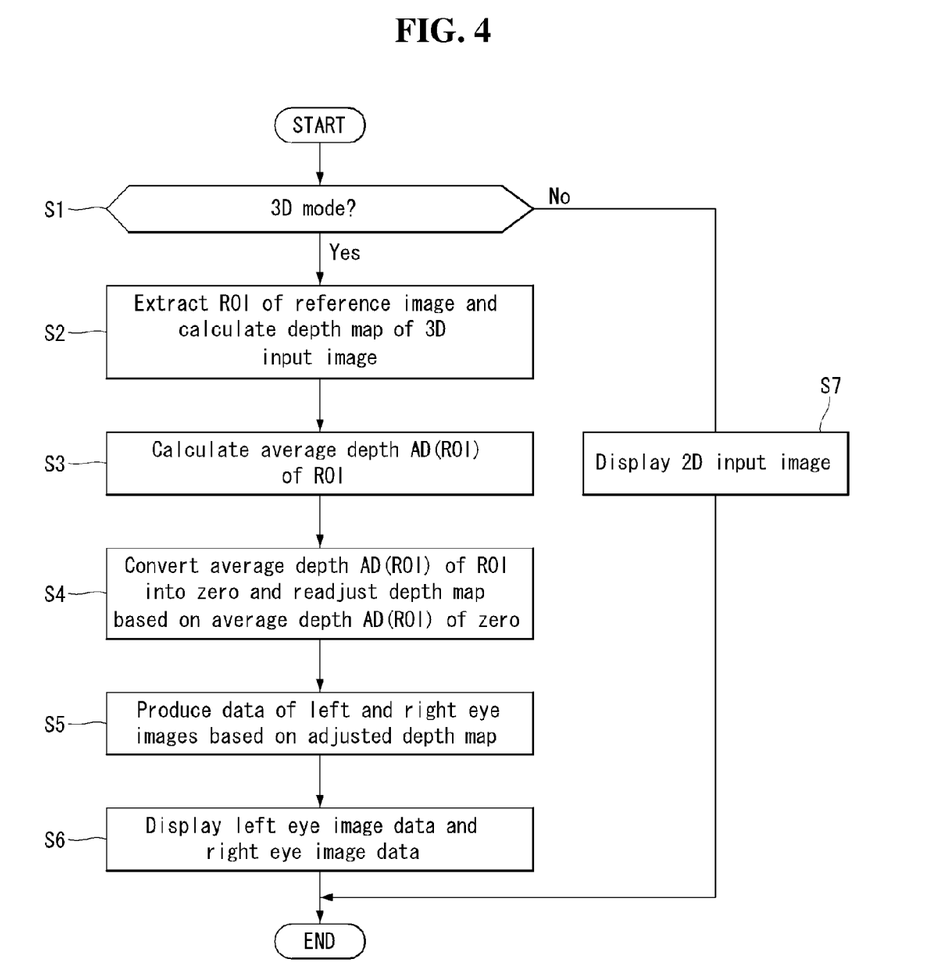
FIG. 4 is a flow chart sequentially illustrating a method of adjusting a stereoscopic image of a stereoscopic image display according to an exemplary embodiment of the invention.

As shown in FIG. 4, a method of adjusting a stereoscopic image of a stereoscopic image display according to an embodiment of the invention selects one of a left eye image and a right eye image of a 3D input image in a 3D mode as data of a reference image. The stereoscopic image adjusting method according to the embodiment of the invention extracts a region of interest (ROI) from the reference image data and calculates a depth map showing a depth of a binocular disparity of the 3D input image in steps S1 and S2. A method for extracting the ROI and a method for calculating the depth map may be implemented by any known method. For example, the method for extracting the ROI may use a method disclosed in Xiaodi Hou and Liqing Zhang, "Saliency Detection: A Spectral Residual Approach", Proc. CVPR, 2007. The method for calculating the depth map may use a method disclosed in Andreas Klaus, Mario Sorman, and Konrad Karner, "Segment-based stereo matching using belief propagation and a self-adapting dissimilarity measure" Proc. IEEE Int. Conf. Pattern Recognit. pp. 15, 2006.

Subsequently, the stereoscopic image adjusting method according to the embodiment of the invention calculates an average depth AD(ROI) of the ROI in the depth map in step S3. The stereoscopic image adjusting method converts the average depth AD(ROI) of the ROI calculated in step S3 into zero and shifts depth values of the 3D input image based on the converted average depth AD(ROI) (=zero) of the ROI so that a difference between the depth values of the 3D input image is maintained, thereby adjusting the depth map calculated in step S2 in step S4.

Subsequently, the stereoscopic image adjusting method maps the depth map adjusted in step S4 to the reference image data and produces data of the left and right eye images having the binocular disparity defined by the adjusted depth map in step S5. The stereoscopic image adjusting method displays the left eye image data and the right eye image data on the stereoscopic image display in step S6. A method for producing the left eye image data and the right eye image data based on the depth map may use any known algorism. The stereoscopic image display may implement the stereoscopic image through a glasses type method or a non-glasses type method and displays the left eye image and the right eye image on a display panel in a time division manner or a spatial division manner.

The stereoscopic image adjusting method displays a 2D input image on the stereoscopic image display in a 2D mode in step S7.

Figure 5:
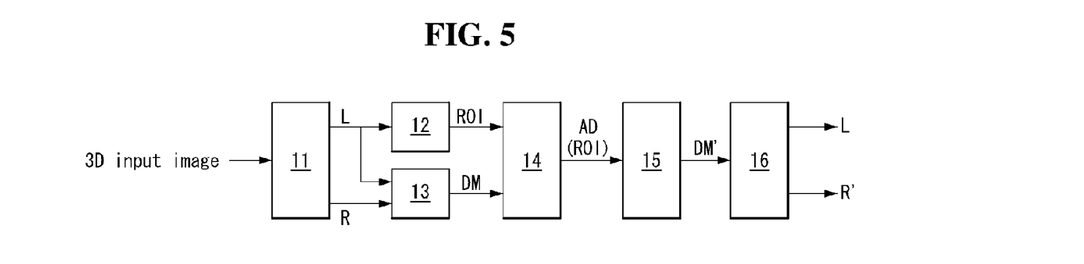
FIG. 5 illustrates a stereoscopic image adjusting circuit of a stereoscopic image display according to a first embodiment of the invention.
Figure 6:
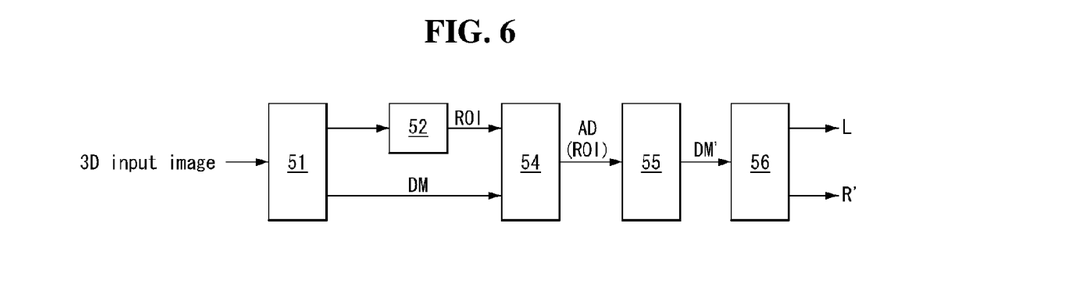
FIG. 6 illustrates a stereoscopic image adjusting circuit of a stereoscopic image display according to a second embodiment of the invention.
Figure 7:
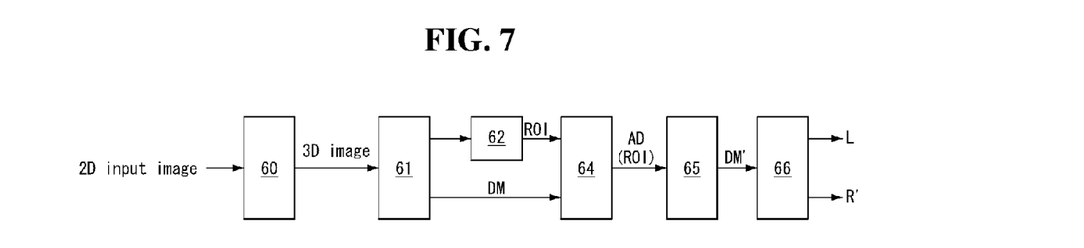
FIG. 7 illustrates a stereoscopic image adjusting circuit of a stereoscopic image display according to a third embodiment of the invention.

FIGS. 5 to 7 illustrate a stereoscopic image adjusting circuit of the stereoscopic image display according to various embodiments of the invention.

FIG. 5 illustrates a stereoscopic image adjusting circuit of the stereoscopic image display according to a first embodiment of the invention.

As shown in FIG. 5, the stereoscopic image adjusting circuit according to the first embodiment of the invention includes a left/right eye image separating unit 11, an ROI extracting unit 12, a depth map extracting unit 13, an average depth calculating unit 14, a depth map adjusting unit 15, a left/right eye image producing unit 16, etc.

The left/right eye image separating unit 11 receives a 3D input image and separates a left eye image and a right eye image from the 3D input image. The ROI extracting unit 12 selects one of the left eye image and the right eye image received from the left/right eye image separating unit 11 as a reference image, analyzes data of the reference image, and extracts an ROI from the reference image. For example, as shown in FIG. 5, the ROI extracting unit 12 selects the left eye image as the reference image and extracts an ROI from the left eye image. Alternatively, the ROI extracting unit 12 may select the right eye image as the reference image and may extract an ROI from the right eye image. The depth map extracting unit 13 compares and analyzes the left eye image and the right eye image received from the left/right eye image separating unit 11 with each other in each pixel and extracts a depth map DM defining a depth of the binocular disparity between the left eye image and the right eye image.

The average depth calculating unit 14 maps an image of the ROI received from the ROI extracting unit 12 and the depth map DM received from the depth map extracting unit 13. Further, the average depth calculating unit 14 extracts a depth map of the ROI and calculates an average depth AD(ROI) from the depth map of the ROI.

The depth map adjusting unit 15 converts the average depth AD(ROI) of the ROI received from the average depth calculating unit 14 into zero. When the average depth AD(ROI) of the ROI is converted into zero, there is little binocular disparity between the left eye image and the right eye image of the ROI because most of depth values of the ROI are positioned on the screen or around the screen. The depth map adjusting unit 15 shifts depth values of the 3D input image based on "the average depth AD(ROI) of the ROI=0 (zero)" and adjusts the depth map, so that the viewer can feel a stereoscopic feeling of the 3D input image by maintaining the binocular disparity between the left eye image and the right eye image in the 3D input image.

The left/right eye image producing unit 16 maps a depth map DM' adjusted by the depth map adjusting unit 15 and the reference image data and produces left eye image data L and right eye image data R having the binocular disparity defined by the depth map DM'.

FIG. 6 illustrates a stereoscopic image adjusting circuit of the stereoscopic image display according to a second embodiment of the invention.

As shown in FIG. 6, the stereoscopic image adjusting circuit according to the second embodiment of the invention includes a reference image and depth map separating unit 51, an ROI extracting unit 52, an average depth calculating unit 54, a depth map adjusting unit 55, a left/right eye image producing unit 56, etc.

The 3D input image in FIG. 6 does not include the left eye image and the right eye image and may be encoded in a format including a reference image and a depth map.

The reference image and depth map separating unit 51 receives the 3D input image and separates a reference image and a depth map DM from the 3D input image. The ROI extracting unit 52 analyzes data of the reference image received from the reference image and depth map separating unit 51 and extracts an ROI from the reference image.

The an average depth calculating unit 54 maps an image of the ROI received from the ROI extracting unit 52 and the depth map DM received from the reference image and depth map separating unit 51. Further, the average depth calculating unit 54 extracts a depth map of the ROI and calculates an average depth AD(ROI) of the ROI from the depth map.

The depth map adjusting unit 55 converts the average depth AD(ROI) of the ROI received from the average depth calculating unit 54 into zero. When the average depth AD(ROI) of the ROI is converted into zero, there is little binocular disparity between the left eye image and the right eye image of the ROI because most of depth values of the ROI are positioned on the screen or around the screen. The depth map adjusting unit 55 shifts depth values of the 3D input image based on "the average depth AD(ROI) of the ROI=0 (zero)" and adjusts the depth map, so that the viewer can feel a stereoscopic feeling of the 3D input image by maintaining the binocular disparity between the left eye image and the right eye image in the 3D input image.

The left/right eye image producing unit 56 maps a depth map DM' adjusted by the depth map adjusting unit 55 and the reference image data and produces left eye image data L and right eye image data R having the binocular disparity defined by the depth map DM'.

FIG. 7 illustrates a stereoscopic image adjusting circuit of the stereoscopic image display according to a third embodiment of the invention.

As shown in FIG. 7, the stereoscopic image adjusting circuit according to the third embodiment of the invention includes a 2D-3D image converter 60, a reference image and depth map separating unit 61, an ROI extracting unit 62, an average depth calculating unit 64, a depth map adjusting unit 65, a left/right eye image producing unit 66, etc.

The 2D-3D image converter 60 converts the 2D input image into the 3D input image using a previously determined 2D-3D image conversion algorism. The 2D-3D image conversion algorism may use any known algorism. The 2D-3D image conversion algorism may use algorisms disclosed in detail in Korean Patent Application No. 10-2010-0101767 (Oct. 19, 2010) corresponding to the present applicant, and which are hereby incorporated by reference in their entirety. The 3D image output from the 2D-3D image converter 60 may be a format, in which the 3D image is separated into the left eye image and the right eye image, or a format, in which the 3D image includes the reference image and the depth map.

The reference image and depth map separating unit 61 receives the 3D input image from the 2D-3D image converter 60 and separates a reference image and a depth map DM from the 3D input image. The reference image may be one of the left eye image and the right eye image. The depth map DM may be extracted through a comparison and an analysis between the left eye image and the right eye image in each pixel. The ROI extracting unit 62 analyzes data of the reference image received from the reference image and depth map separating unit 61 and extracts an ROI based on the result of the analysis.

The average depth calculating unit 64 maps an image of the ROI received from the ROI extracting unit 62 and the depth map DM received from the reference image and depth map separating unit 61. Further, the average depth calculating unit 64 extracts a depth map of the ROI and calculates an average depth AD(ROI) from the depth map of the ROI.

The depth map adjusting unit 65 converts the average depth AD(ROI) of the ROI received from the average depth calculating unit 64 into zero. When the average depth AD(ROI) of the ROI is converted into zero, there is little binocular disparity between the left eye image and the right eye image of the ROI because most of depth values of the ROI are positioned on the screen or around the screen. The depth map adjusting unit 65 shifts depth values of the 3D input image based on "the average depth AD(ROI) of the ROI=0 (zero)" and adjusts the depth map, so that the viewer can feel a stereoscopic feeling of the 3D input image by maintaining the binocular disparity between the left eye image and the right eye image in the 3D input image.

The left/right eye image producing unit 66 maps a depth map DM' adjusted by the depth map adjusting unit 65 and the reference image data and produces left eye image data L and right eye image data R having the binocular disparity defined by the depth map DM'.

Figure 8A:
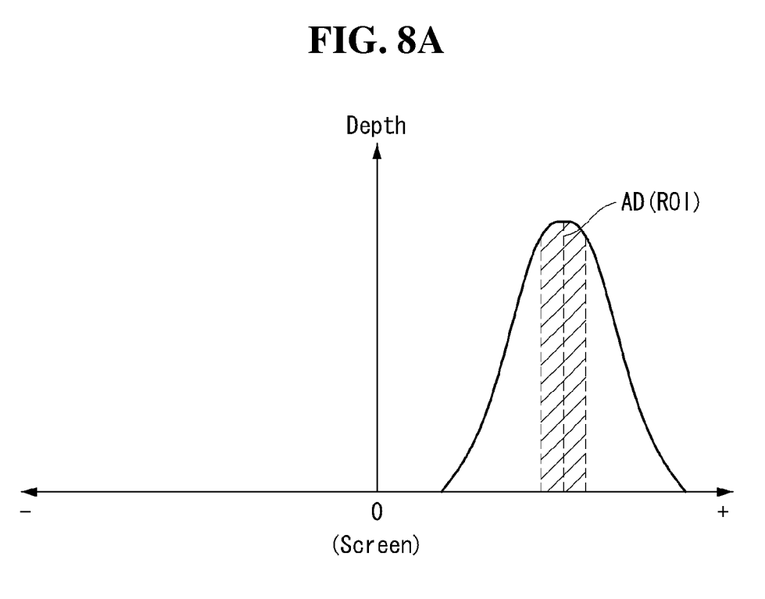
FIG. 8A illustrates an example of a 3D input image where a virtual image of a region of interest (ROI) is positioned in front of the screen.
Figure 8B:
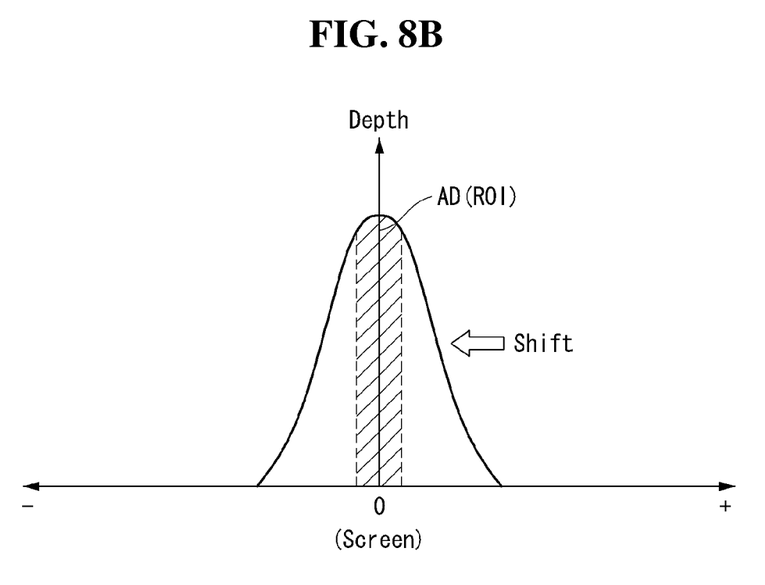
FIG. 8B illustrates an example where an average depth of the ROI in the 3D input image shown in FIG. 8A is converted into a screen position and depth values of the 3D input image are shifted in the same direction as a shift direction of the average depth of the ROI.

FIG. 8A illustrates an example of a 3D input image where a virtual image of an ROI is positioned in front of the screen. FIG. 8B illustrates an example where an average depth AD(ROI) of the ROI in the 3D input image shown in FIG. 8A is converted into a screen position (depth=0) and a depth map of the 3D input image is shifted in the same direction as a shift direction of the average depth AD(ROI) of the ROI. In FIGS. 8A and 8B, the x-axis is a distance of the virtual image from the screen, and the y-axis is a depth value of the 3D input image. A depth of the screen is zero (refer to FIG. 1C). As the depth values go to the '+' direction of the x-axis, the virtual image of the 3D input image is positioned in front of the screen (refer to FIG. 1A). Further, as the depth values go to the '−' direction of the x-axis, the virtual image of the 3D input image is positioned behind the screen (refer to FIG. 1B). In FIGS. 8A and 8B, it is assumed that a portion having an oblique line pattern is a distribution of the depth values of the ROI.

As shown in FIG. 8A, when the virtual image of the ROI is positioned in front of the screen position (depth=0), the disagreement between convergence and accommodation of the viewer's eyes increases. Hence, a fatigue of the viewer increases, and the viewer may perceive the 3D crosstalk. The stereoscopic image adjusting circuit and the stereoscopic image adjusting method according to the embodiment of the invention extract the ROI from the 3D input image and shift the average depth AD(ROI) of the ROI to zero, i.e., the screen position of the display panel. Further, the stereoscopic image adjusting circuit and the stereoscopic image adjusting method according to the embodiment of the invention shift the depth values of the 3D input image in a shift direction of the average depth AD(ROI) by a shifted amount of the average depth AD(ROI) of the ROI as shown in FIG. 8B, so that a stereoscopic feeling of the 3D input image can be maintained.

The stereoscopic image adjusting circuit and the stereoscopic image adjusting method according to the embodiment of the invention adjust the depth map of the 3D input image through the method illustrated in FIGS. 8A and 8B. Further, when the virtual image of the ROI is positioned behind the screen as shown in FIG. 9A, a depth map of the 3D input image may be adjusted through a method illustrated in FIG. 9B.

Figure 9A:
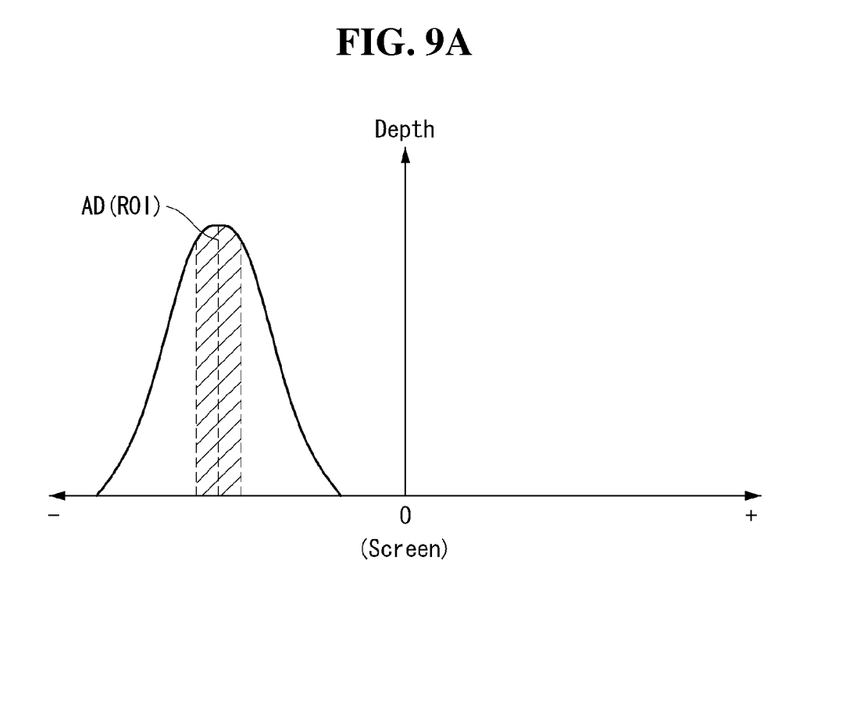
FIG. 9A illustrates an example of a 3D input image where a virtual image of an ROI is positioned behind the screen.
Figure 9B:
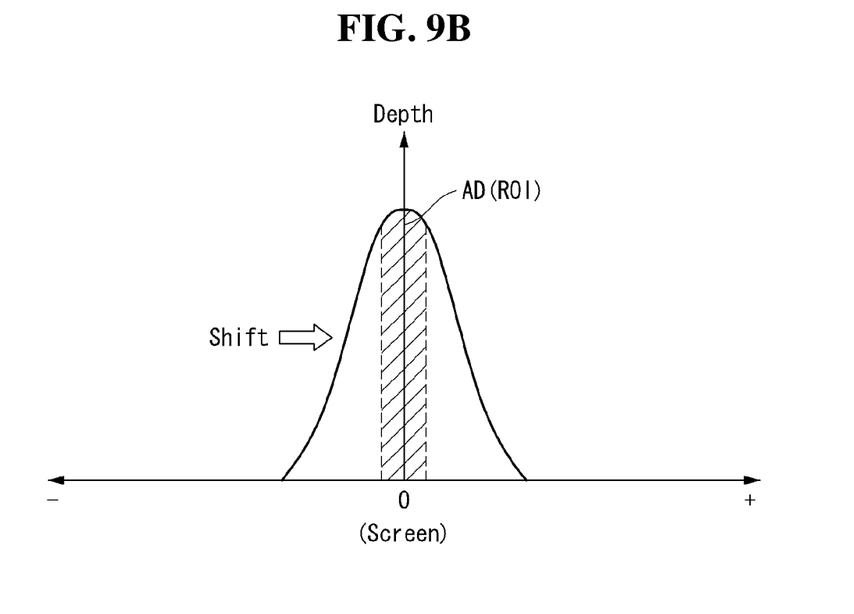
FIG. 9B illustrates an example where an average depth of the ROI in the 3D input image shown in FIG. 9A is converted into a screen position and depth values of the 3D input image are shifted in the same direction as a shift direction of the average depth of the ROI.

FIG. 9A illustrates an example of a 3D input image where a virtual image of an ROI is positioned behind the screen. FIG. 9B illustrates an example where an average depth AD(ROI) of the ROI in the 3D input image shown in FIG. 9A is converted into a screen position (depth=0) and a depth map of the 3D input image is shifted in the same direction as a shift direction of the average depth AD(ROI) of the ROI. In FIGS. 9A and 9B, the x-axis is a distance of the virtual image from the screen, and the y-axis is a depth value of the 3D input image. In FIGS. 9A and 9B, it is assumed that a portion having an oblique line pattern is a distribution of the depth values of the ROI.

As shown in FIG. 9A, when the virtual image of the ROI is positioned behind the screen position (depth=0), the disagreement between convergence and accommodation of the viewer's eyes is generated. Hence, the viewer may feel fatigue and may perceive the 3D crosstalk. The stereoscopic image adjusting circuit and the stereoscopic image adjusting method according to the embodiment of the invention extract the ROI from the 3D input image and shift the average depth AD(ROI) of the ROI to zero, i.e., the screen position of the display panel. Further, the stereoscopic image adjusting circuit and the stereoscopic image adjusting method according to the embodiment of the invention shift the depth values of the 3D input image in a shift direction of the average depth AD(ROI) by a shifted amount of the average depth AD(ROI) of the ROI as shown in FIG. 9B, so that a stereoscopic feeling of the 3D input image can be maintained.

The stereoscopic image adjusting circuit and the stereoscopic image adjusting method according to the embodiment of the invention adjust the depth map of the 3D input image through the methods illustrated in FIGS. 8A to 9B. As a result, the stereoscopic image adjusting circuit and the stereoscopic image adjusting method according to the embodiment of the invention may reduce the 3D crosstalk the viewer perceives because the binocular disparity in the ROI of the 3D input image is not large. Furthermore, because the ROI is positioned on the screen, the stereoscopic image adjusting circuit and the stereoscopic image adjusting method according to the embodiment of the invention may minimize the fatigue of the viewer resulting from the disagreement between convergence and accommodation of the viewer's eyes.

Figure 10:
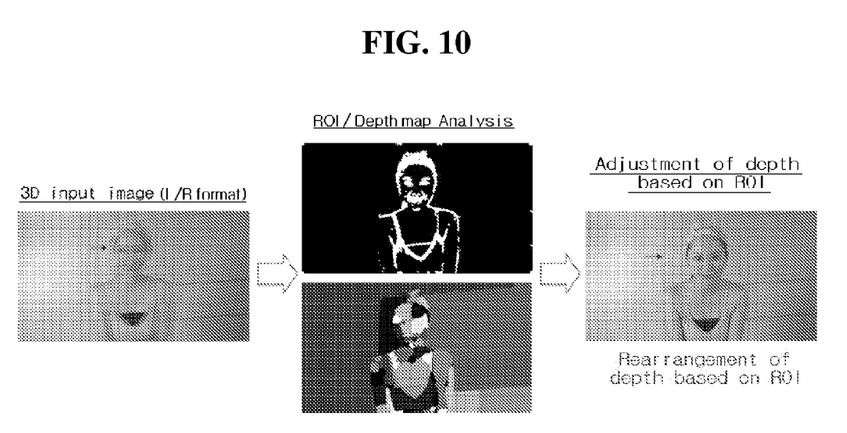
FIG. 10 illustrates images of an experimental result according to an exemplary embodiment of the invention.

FIG. 10 illustrates images of an experimental result according to the embodiment of the invention.

As shown in FIG. 10, a left image is a 3D original image used in an experiment. In the 3D original image, a bust image of a woman corresponding to the ROI has large binocular disparity between a left eye image and a right eye image, and a virtual image thereof is positioned in front of the screen. The viewer may perceive the 3 D crosstalk in the ROI of the 3D original image because of a distance difference between the left eye image and the right eye image of the ROI.

An upper image in the center is an image obtained by extracting the ROI from the 3D original image (i.e., a reference image). A lower image in the center is an image obtained by imaging a depth map of the 3D original image.

The stereoscopic image display according to the embodiment of the invention converts the average depth of the ROI into zero and adjusts the depth map of the 3D original image based on the average depth of the ROI having zero, thereby producing new left eye image data and new right eye image data as shown in a right image of FIG. 10. As can be seen from the right image of FIG. 10 to which the stereoscopic image adjusting method according to the embodiment of the invention is applied, because there is no binocular disparity between the left eye image and the right eye image, the fatigue of the viewer may be reduced, the 3D crosstalk may be minimized.

The stereoscopic image display according to the embodiment of the invention may be implemented as a glasses type stereoscopic image display and a non-glasses type stereoscopic image display. A display element of the stereoscopic image display according to the embodiment of the invention may be implemented based on a display panel of a flat panel display such as a liquid crystal display (LCD), a field emission display (FED), a plasma display panel (PDP) display, an electroluminescence device (EL) such as an organic light emitting diode (OLED) display, and an electrophoresis display (EPD).

Figure 11:
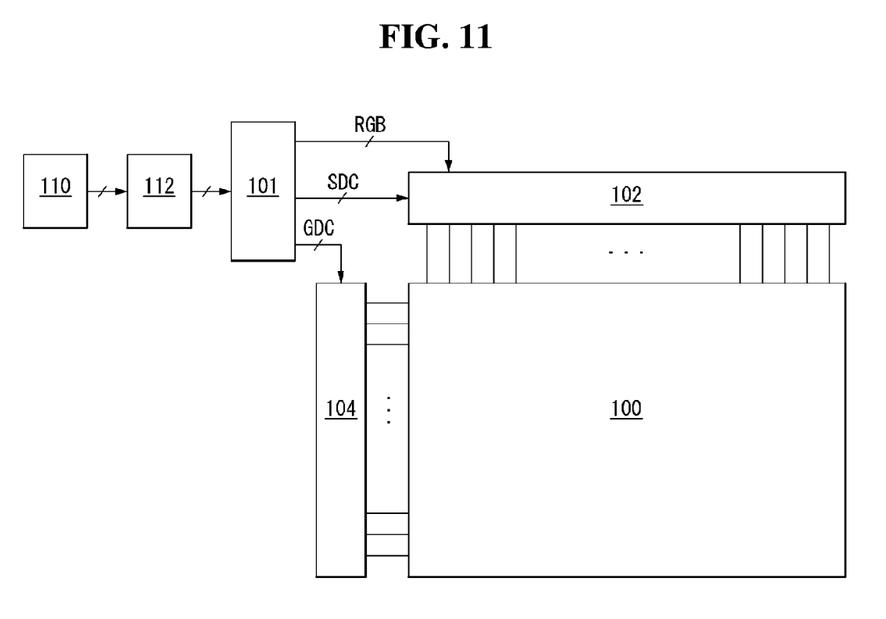
FIG. 11 is a block diagram of a stereoscopic image display according to an exemplary embodiment of the invention.

FIG. 11 is a block diagram of the stereoscopic image display according to the embodiment of the invention.

As shown in FIG. 11, the stereoscopic image display according to the embodiment of the invention includes a display panel 100, a stereoscopic image adjusting circuit 112, a timing controller 101, a data driving circuit 102, a scan driving circuit 104, etc.

The display panel 100 may be implemented as the display panel of the above-described flat panel display. When the display panel 100 selects an LCD panel, a backlight unit for providing light to the display panel 100 is necessary. The display panel 100 displays the 2D image data in the 2D mode and displays the left eye image data and the right eye image data in the time division manner or the spatial division manner in the 3D mode.

The stereoscopic image adjusting circuit 112 extracts the ROI from the 3D input image, shifts the average depth AD(ROI) of the ROI to the screen of the display panel 100, and adjusts the depth map of the 3D input image based on the shift of the average depth AD(ROI). The stereoscopic image adjusting circuit 112 produces new left eye image data and new right eye image data based on the adjusted depth map and supplies them to the timing controller 101. The stereoscopic image adjusting circuit 112 may be configured as illustrated in FIGS. 5 to 7.

The timing controller 101 supplies the data driving circuit 102 with a 2D input image received from a host system 110 through the stereoscopic image adjusting circuit 112 or digital video data RGB of a 3D input image received from the stereoscopic image adjusting circuit 112. The timing controller 101 receives a timing signal, such as a vertical sync signal, a horizontal sync signal, a data enable, and a dot clock, from the host system 110 through the stereoscopic image adjusting circuit 112 and generates control signals for controlling operation timings of the data driving circuit 102 and the scan driving circuit 104.

The timing controller 101 may switch between the 2D mode and the 3D mode of the data driving circuit 102, the scan driving circuit 104, or a backlight driving circuit (not shown) based on a mode signal (not shown) received from the host system 110 through the stereoscopic image adjusting circuit 112 or an identification code coded to an input image signal.

The data driving circuit 102 and the scan driving circuit 104 are display panel driving circuits for displaying digital video data of the 2D or 3D image received from the timing controller 101 on the display panel 100.

The data driving circuit 102 latches the digital video data of the 2D/3D image under the control of the timing controller 101. The data driving circuit 102 converts the latched digital video data into an analog data voltage or a data current and outputs the analog data voltage or the data current to the data lines. When the data voltage, whose a polarity is inverted as in the LCD or the EPD, is supplied to the display panel 100, the data driving circuit 102 converts the digital video data of the 2D/3D image into positive and negative analog gamma compensation voltages under the control of the timing controller 101 and inverts a polarity of the data voltage to be supplied to the data lines.

The scan driving circuit 104 sequentially supplies the scan lines with a scan pulse synchronized with the data voltage supplied to the data lines under the control of the timing controller 101.

The host system 110 is connected to an external video source device (not shown), for example, a set-top box, a DVD player, a blue-ray player, a personal computer, and a home theater system. The host system 110 includes a system-on-chip (SOC) including a scaler and converts a resolution of the data of the 2D/3D image received from the external video source device into a resolution suitable for a display of the display panel 100.

The host system 110 switches between a 2D mode operation and a 3D mode operation in response to user data input through a user input device (not shown). The user input device includes a keypad, a keyboard, a mouse, an on-screen display (OSD), a remote controller, a touch screen, etc. The viewer may select the 2D mode and the 3D mode through the user input device and may select the 2D-3D image conversion in the 3D mode.

The host system 110 may switch between the 2D mode operation and the 3D mode operation through a 2D/3D identification code encoded to data of the input image. The host system 110 may generate a mode signal capable of deciding whether a current driving mode is the 2D mode or the 3D mode and may transmit the mode signal to the stereoscopic image adjusting circuit 112 and the timing controller 101.

As described above, the stereoscopic image display according to the embodiment of the invention extracts the ROI from the 3D input image, converts the average depth of the ROI into the depth value of the screen position, and adjusts the depth map of the 3D input image based on the average depth of the ROI having the depth value of the screen position so that the stereoscopic feeling of the 3D input image can be maintained. As a result, the stereoscopic image display according to the embodiment of the invention may implement the ROI of the 3D input image as an image not having the binocular disparity, thereby minimizing the 3D crosstalk. Further, the stereoscopic image display according to the embodiment of the invention may reduce the fatigue of the viewer without a loss of the stereoscopic feeling of the 3D input image.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A stereoscopic image display comprising:
    a left/right eye image separator to separate a left eye image and a right eye image from a 3D input image;
    an ROI and depth map extractor to select one of the left eye image and the right eye image as a reference image and extract a region of interest (ROI) from the reference image and a depth map of the 3D input image from the left eye image and the right eye image;
    an average depth calculator to calculate an average value of all depths of the ROI as an average depth;
    a depth map adjuster to adjust the depth map by shifting depth values of the 3D input image in a same direction by an amount of the average depth of the ROI such that the average depth of the ROI becomes a screen depth value of a display panel and some depth values of the 3D input image are converted from positive values corresponding to in front of the screen of the display panel into negative values corresponding to behind the screen or from negative values into positive values;
    a left/right eye image producer to produce left eye image data and right eye image data based on the depth map adjusted by the depth map adjuster; and
    a display panel driver comprising a data driving circuit to convert digital video data into a data voltage and supply the data voltage to data lines of the display panel, a scan driving circuit to supply scan pulses synchronized with the data voltage to scan lines of the display panel, and a timing controller to control operation timings of the data driving circuit and the scan driving circuit, the display panel driver to display the left eye image data and the right eye image data received from the left/right eye image producer on the display panel.

2. The stereoscopic image display of claim 1, further comprising a 2D-3D image converter to convert a 2D input image into the 3D input image.

3. The stereoscopic image display of claim 1, wherein the display panel is implemented as a display panel of one of a liquid crystal display (LCD), a field emission display (FED), a plasma display panel (PDP) display, an electroluminescence device (EL), and an electrophoresis display (EPD).

4. A method of adjusting a stereoscopic image of a stereoscopic image display, the method comprising:

separating a left eye image and a right eye image from a 3D input image;

selecting one of the left eye image and the right eye image as a reference image;

extracting a region of interest (ROI) from the reference image and a depth map of the 3D input image from the left eye image and the right eye image;

calculating an average value of all depths of the ROI as an average depth;

adjusting the depth map by shifting depth values of the 3D input image in a same direction by an amount of the average depth of the ROI such that the average depth of the ROI becomes a screen depth value of a display panel and some depth values of the 3D input image are converted from positive values corresponding to in front of the screen of the display panel into negative values corresponding to behind the screen or from negative values into positive values;

producing left eye image data and right eye image data based on the adjusted depth map; and displaying the left eye image data and the right eye image data on the display panel.

5. The method of claim 4, further comprising converting a 2D input image into the 3D input image.

* * * * *